US008398188B2

(12) United States Patent
Nakata

(10) Patent No.: US 8,398,188 B2
(45) Date of Patent: Mar. 19, 2013

(54) RECORDING APPARATUS

(75) Inventor: Kazuhiro Nakata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 12/474,543

(22) Filed: May 29, 2009

(65) Prior Publication Data

US 2009/0295845 A1 Dec. 3, 2009

(30) Foreign Application Priority Data

Jun. 2, 2008 (JP) ................................ 2008-144340

(51) Int. Cl.

| | |
|---|---|
| ***B41J 29/38*** | (2006.01) |
| *B41J 29/393* | (2006.01) |
| *H02H 9/00* | (2006.01) |
| *H02H 3/20* | (2006.01) |
| *H02H 3/24* | (2006.01) |
| *G05F 1/10* | (2006.01) |

(52) U.S. Cl. .................... 347/5; 347/9; 347/10; 347/19; 361/52; 361/90; 323/234

(58) Field of Classification Search ................ 347/5, 10; 361/52, 90; 323/234

See application file for complete search history.

(56) References Cited

U.S. PATENT DOCUMENTS

| | | | | |
|---|---|---|---|---|
| 5,376,831 | A * | 12/1994 | Chen | 327/379 |
| 5,631,675 | A * | 5/1997 | Futagawa | 347/10 |
| 5,711,619 | A | 1/1998 | Kaneko et al. | |
| 5,805,177 | A * | 9/1998 | Takahashi | 347/11 |
| 5,821,951 | A * | 10/1998 | Fujii et al. | 347/10 |
| 5,861,737 | A * | 1/1999 | Goerke et al. | 323/282 |
| 6,068,360 | A * | 5/2000 | Hiwada | 347/14 |
| 6,104,178 | A * | 8/2000 | Sugimoto | 323/315 |
| 6,481,814 | B2 * | 11/2002 | DeMoor et al. | 347/5 |
| 6,831,449 | B2 * | 12/2004 | Nishida et al. | 323/284 |
| 7,215,106 | B2 * | 5/2007 | Sato | 323/282 |
| 2005/0225579 | A1 * | 10/2005 | Umeda | 347/9 |
| 2006/0221162 | A1 * | 10/2006 | Naruse et al. | 347/104 |
| 2007/0132795 | A1 * | 6/2007 | Han | 347/9 |
| 2007/0171258 | A1 * | 7/2007 | Kosugi | 347/59 |
| 2007/0216714 | A1 * | 9/2007 | Sato | 347/5 |

* cited by examiner

*Primary Examiner* — Laura Martin
*Assistant Examiner* — Jeremy Bishop
(74) *Attorney, Agent, or Firm* — Canon USA Inc. IP Division

(57) ABSTRACT

A recording apparatus includes an electrolytic capacitor for stabilizing the head power source voltage, a transistor for charging the electrolytic capacitor, a transistor for discharging the electrolytic capacitor, a push-pull circuit, a resistor for controlling the charging/discharging current to the electrolytic capacitor, and a resistor for dividing the head power source voltage. The power supply to the head is turned on with the head power source voltage increased by the capacitor.

8 Claims, 6 Drawing Sheets

RECORDING APPARATUS

BACKGROUND OF THE INVENTION

1. Field of the Invention

The present invention relates to a recording apparatus, and more specifically, it relates to a recording apparatus having a unit that controls turning on and off of the power supply to a recording head.

2. Description of the Related Art

Current ink jet recording apparatuses have an ink jet head having many ink jet nozzles and select nozzles to eject ink according to print data. In such recording apparatuses, the number of nozzles to drive at the same time varies depending on print data, and the power consumed by the recording head also vary greatly. For this reason, the instantaneous power consumption of the recording head is considerably large compared to the average power consumption thereof. Of course, a power source that supplies power to the recording head needs to have a capacity to supply power that exceeds the power consumption of the recording head.

Recent recording apparatuses tend to have an increased number of nozzles and an increased driving speed to achieve faster and finer recording and also tend to consume increased power during operation. It is not unusual for common and inexpensive ink jet printers for home use to instantaneously consume power exceeding 20 W during operation, so the power source must have sufficient capacity therefor.

In order to stably drive the recording head so that the ejection characteristics do not vary depending on the number of nozzles to drive at the same time, the power source must have a low-impedance output characteristic such that the power source voltage varies little when the electrical load varies.

In power source circuits used in relatively inexpensive electronic devices such as household appliances, inserting a resistor into a route through which the current flows and measuring the voltage drop due to the resistor is a usual method for detecting the change in load current of the power source output. However, when a low-impedance power source such that the power source voltage varies little when the electrical load varies is required, it is undesirable to insert a resistance component into the electrical route. In order to detect the load current of the power source output, an expensive detecting circuit is necessary. This increases the cost of the device.

In some known recording apparatuses, when the recording head is not attached to the main body of the recording apparatus, the power supply to the recording head is stopped. Such recording apparatuses have a unit that controls turning on and off of the power supply to the recording head and thereby perform control so as not to apply unnecessary load current to the head, the unnecessary load current being, for example, due to the short circuit when the recording head is attached.

However, since the recording apparatuses have a unit that controls turning on and off of the power supply to the recording head, an inrush current to the recording head can occur when the power supply is turned on after the head is attached. In this inrush current, a large current flows in a short period of time. Therefore, electrical noise is generated and the circuit malfunctions. Recent FETs have low on-resistance and high response speed and exhibit excellent characteristics as switching elements. As shown in FIG. 3 of U.S. Pat. No. 5,711,619, there is known a configuration in which a FET is used as an element for switching the power supply to the recording head. Such a configuration increases an inrush current when the switching characteristic is on, and a malfunction due to noise can occur.

In the configuration disclosed in U.S. Pat. No. 5,711,619, a unit that detects whether or not the recording head is attached is provided, and when the recording head is not attached, the power supply to the recording head is stopped.

However, when the recording head is attached and the power supply to the recording head is turned on, if a problem due to trouble or deterioration of the recording head, such as an electrical short circuit of the recording head itself, occurs, it is impossible to detect such a problem and to stop the power supply to the recording head.

In such a case, a short circuit occurs between the power source voltage HVH to the recording head and the head (including the inside of the head), and the resistance value in the circuit in the head becomes zero to several ohms. In such a short circuit state, the power source becomes overloaded in a short time, and therefore the overload protection function of the power source works to shut down the power source. Since the power supply is stopped in a short time, problems such as temperature rise are unlikely to occur.

In contrast, a halfway short circuit such that the resistance value of the circuit in the head becomes several to several hundred ohms, can occur. In such a short circuit state, the overcurrent in the head generated by the short circuit is small, and about the same amount of current as the current that flows during normal head driving, continues to flow. That is, due to the abnormal current flow, about several watts of additional power is consumed. Considering the power supplying capability of the power source, if the power increases by about several watts, the recording head can continue to operate without problems. However, even though it is about several watts, if abnormal power is consumed for many hours, the temperature rises and secondary effects on other components can occur.

SUMMARY OF THE INVENTION

The present invention provides a recording apparatus that can reduce the inrush current when the power supply to the recording head is turned on and can prevent a sudden change in power source voltage.

In addition, the present invention provides a recording apparatus that can stop the power supply to the recording head if the recording head is short-circuited when the power supply to the recording head is turned on.

In an aspect of the present invention, a recording apparatus includes a recording head, a power source portion, a capacitor, a power supply switching unit, a power supply adjusting circuit, a power source voltage detecting circuit, and a control unit. The power source portion supplies the recording head with power for recording. The capacitor is provided in a power supply circuit from the power source portion to the recording head and stabilizes the power supply to the recording head. The power supply switching unit switches the power supply from the power source portion to the recording head. The power supply adjusting circuit adjusts the charging of the capacitor during the power supply to the recording head. The power source voltage detecting circuit detects the supply voltage to the head by the power supply adjusting circuit. The control unit, on the basis of the voltage of the head detected by the power source voltage detecting circuit, switches the power supply switching unit and controls the power supply to the recording head by the power source portion.

As described above, the present invention can provide a recording apparatus that can reduce the inrush current when the power supply to the recording head is turned on and can prevent a sudden change in power source voltage. In addition, the present invention can provide a recording apparatus that can stop the power supply to the recording head if the recording head is short-circuited when the power supply to the recording head is turned on.

Further features of the present invention will become apparent from the following description of exemplary embodiments with reference to the attached drawings.

DESCRIPTION OF THE EMBODIMENTS

First Embodiment

A first embodiment of the present invention will hereinafter be described with reference to the drawings.

Figure 1:
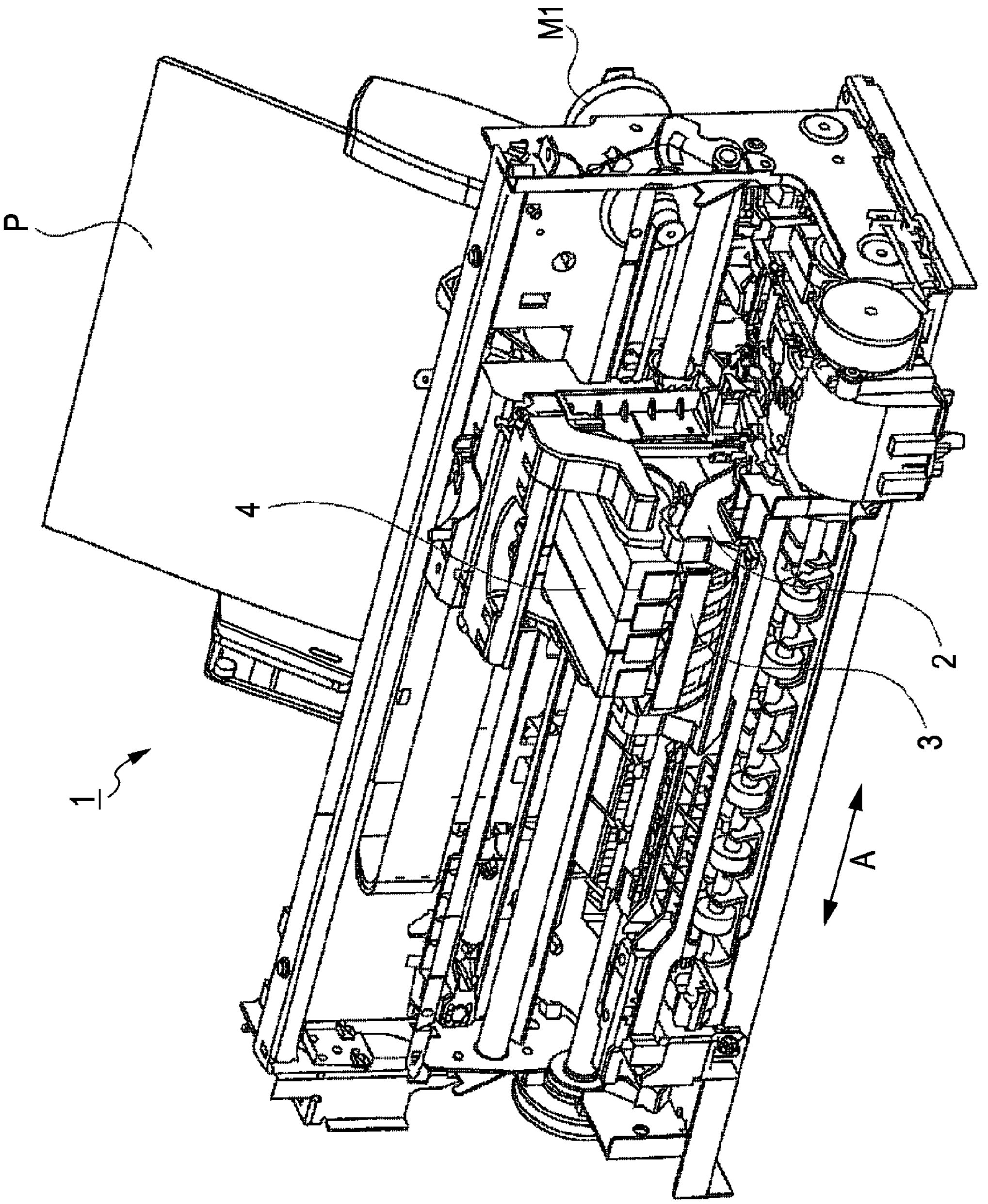
FIG. 1 is an external perspective view showing the outline of the configuration of a recording apparatus according to a first embodiment.

FIG. 1 is an external perspective view showing the outline of the configuration of an ink jet recording apparatus 1 that is a typical embodiment of the present invention.

In the ink jet recording apparatus 1, the driving force of a carriage motor M1 is transmitted to a carriage 2 on which a recording head 3 is mounted, and the carriage 2 is reciprocated in the direction of arrow A. In addition, a recording medium P is conveyed to a recording position, where the recording head 3 ejects ink onto the recording medium P, thereby performing recording.

On the carriage 2 is mounted not only the recording head 3 but also ink cartridges 4 that contain ink to be supplied to the recording head 3. The ink cartridges 4 are detachable from the carriage 2.

The recording apparatus 1 shown in FIG. 1 is capable of color recording. For this purpose, the ink cartridges 4 include four ink cartridges that contain magenta (M), cyan (C), yellow (Y), and black (K) inks. These four ink cartridges can be separately attached and detached.

The joint surfaces of the carriage 2 and the recording head 3 are appropriately in contact with each other so as to effect and maintain the necessary electrical connection. In response to a recording signal, energy is applied to the recording head 3. A plurality of ejection orifices are thereby selectively caused to eject ink for recording. In the recording head 3 of this embodiment, an ink jet method is employed in which ink is ejected using thermal energy. For generating thermal energy, the recording head 3 has electric thermal conversion members. Electrical energy is applied to the electric thermal conversion members and converted into thermal energy. The thermal energy is applied to ink and causes film boiling. The expansion and contraction of a bubble due to the film boiling causes pressure change. Using this pressure change, ink is ejected from the ejection orifices. The electric thermal conversion members are provided for respective ejection orifices. In response to a recording signal, a pulse voltage is applied to corresponding electric thermal conversion members. Ink is thereby ejected from corresponding ejection orifices.

Figure 2:
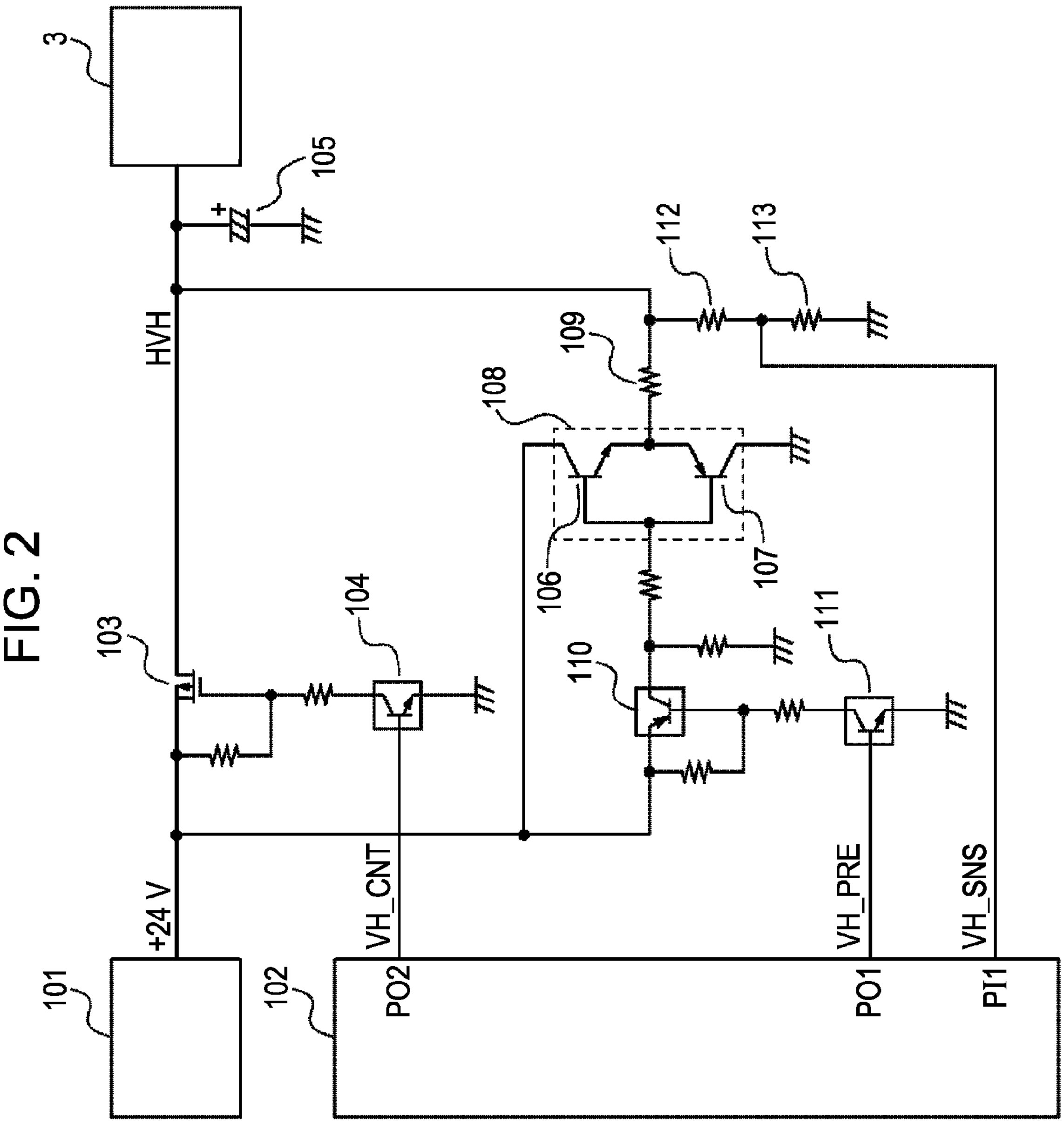
FIG. 2 is a block diagram showing the main configuration of a control circuit of a recording apparatus according to a first embodiment.

FIG. 2 is a block diagram showing the main configuration of a control circuit of the recording apparatus 1. In FIG. 2, reference numeral 101 denotes a power source portion that generates a head power source voltage of 24 V to drive the head 3, reference numeral 102 denotes a CPU for controlling the whole recording apparatus, and reference numeral 103 denotes a switching FET for turning on and off the supply of the head power source voltage to the recording head 3. The switching FET 103 is provided in a route connecting the power source portion 101 and the recording head 3, functions as a unit for switching the power supply from the power source portion 101 to the recording head 3, and controls turning on and off of the supply of the power source voltage. Reference numeral 104 denotes a transistor for turning on and off the switching FET 103. Reference numeral 105 denotes an electrolytic capacitor for stabilizing the head power source voltage. Reference numeral 106 denotes a transistor for charging the electrolytic capacitor 105. Reference numeral 107 denotes a transistor for discharging the electrolytic capacitor 105. A circuit composed of the power source portion 101, the switching FET 103, the recording head 3, and the electrolytic capacitor 105 will be referred to as power supply circuit. Reference numeral 108 denotes a push-pull circuit composed of the transistor 106 and the transistor 107. Reference numeral 109 denotes a resistor for controlling the charge/discharge current to the electrolytic capacitor 105. Reference numeral 110 denotes a transistor for controlling turning on and off of the push-pull circuit 108. Reference numeral 111 denotes a transistor for turning on and off the transistor 110. Reference numerals 112 and 113 denote resistors for dividing the head power source voltage. The resistors 112 and 113 have sufficiently large resistance values compared to the resistor 109 and have little effect on the charge/discharge operation by the push-pull circuit 108 and the resistor 109. The transistors 104, 110, and 111 are resistor built-in transistors.

The power source portion 101 outputs a head power source voltage of 24 V. When the recording apparatus 1 is turned off or in standby mode, the CPU 102 puts output ports PO1 and PO2 at "L" level. At that time, the transistor 104 and the switching FET 103 are turned off, and the head power source voltage is not applied to the recording head 3. In addition, since the output port PO1 is at "L" level, the transistors 111 and 110 are also turned off, and a voltage is not applied to the input of the push-pull circuit 108. PI1 denotes an input port to the CPU 102. Whereas the power source voltage is 24 V, the input voltage to the CPU 102 is about 3.3 V.

The push-pull circuit 108 tries to give out a current when the input voltage to the circuit is higher than the output voltage from the circuit, and it tries to take in a current when the input voltage to the circuit is lower than the output voltage from the circuit. In the present invention, when the recording apparatus 1 is turned off or in standby mode, a voltage is not applied to either the input or output of the push-pull circuit 108, and therefore a current does not flow through the push-pull circuit 108. The push-pull circuit 108 adjusts the below-described charge/discharge of the capacitor, thereby functioning as a circuit that adjusts the power supply to the recording head 3.

Figure 3:
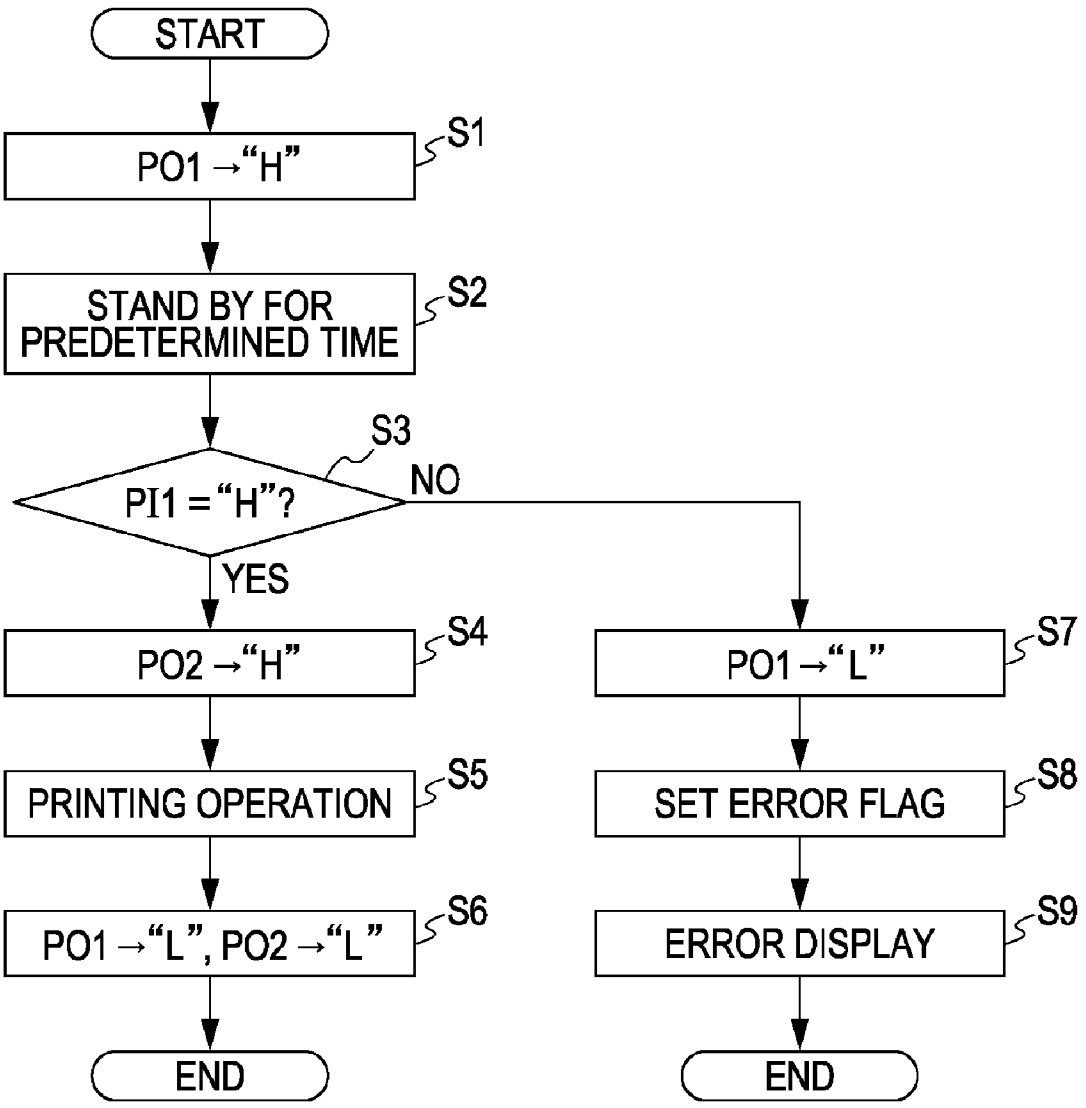
FIG. 3 is a flow chart showing a power supply operation to the recording head.

FIG. 3 is a flow chart showing a power control operation by the CPU 102 when the recording apparatus 1 turns on the power supply to the recording head 3. With reference to FIG. 3, the operation to control the power supply to the recording head 3 will be described.

When the recording apparatus 1 performs a recording operation, in step S1, the CPU 102 raises the output port PO1 to "H" level and turns on the transistors 111 and 110. The voltage of 24 V from the power source portion 101 thereby becomes able to be input to the push-pull circuit 108. Since the head power source voltage of 24 V is applied to the input of the push-pull circuit 108, the push-pull circuit 108 tries to give out a current. However, since the output current (power source voltage to the head) from the push-pull circuit 108 is limited by the resistor 109, the head power source voltage HVH rises with a time constant (RC) defined by the resistor 109 (R) and the electrolytic capacitor 105 (C).

In step S2, the CPU 102 stands by for a predetermined time. This predetermined time corresponds to the time required for the capacitor 105 to be gradually charged and for the voltage thereof to become near 24 V as HVH. Next, in step S3, when the head power source voltage HVH rises to almost 24 V, the CPU 102 reads the level of a signal VH_SNS at the input port PI1. The input port PI1 is an input port to the CPU 102. Whereas the voltage of the power source portion 101 is 24 V, the input voltage to the CPU 102 needs to be about 3.3 V. Therefore, the signal VH_SNS is adjusted by the voltage dividing resistors 112 and 113 so as to rise to "H" level at the input voltage value of 3.3 V to the CPU 102 when the head power source voltage HVH rises to near 24 V. The input voltage to the CPU 102 is a predetermined input voltage value.

If the input port PI1 is at "H" level in step S3, the CPU 102 raises the output port PO2 to "H" level in step S4. The transistor 104 and the switching FET 103 are turned on, and the head power source voltage HVH is supplied through the switching FET 103 to the recording head 3. Since the ON resistance of the switching FET 103 is extremely low, the head power source voltage HVH is stable when the recording head 3 performs the recording operation and a driving current flows to the power source. After supplied with the power source voltage of 24 V, the recording head 3 starts a printing operation in step S5. When the recording operation is finished, the CPU 102 lowers the output ports PO1 and PO2 to "L" level (step S6), and stops the power supply to the recording head 3.

If the input port PI1 is at "L" level in step S3, the CPU 102 returns the output port PO1 to "L" level in step S7. The transistors 111 and 110 are turned off, and the push-pull circuit 108 discharges the electrolytic capacitor 105.

In step S8, the CPU 102 sets an error flag for putting the main body in an error state. Thereafter, the CPU 102 displays a message that reports the error on a display of the main body of the recording apparatus, and puts the main body of the recording apparatus in an error state.

Figure 4:
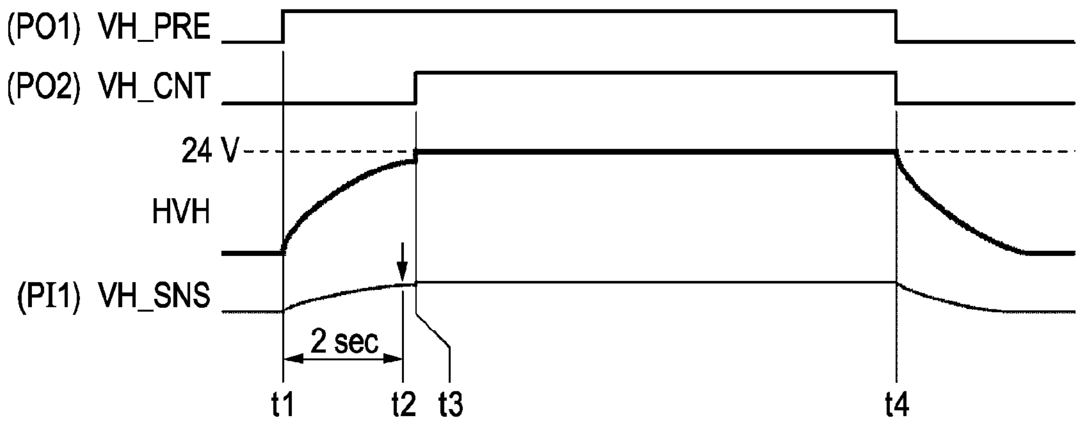
FIG. 4 is a timing chart showing a power supply operation to the recording head.

FIG. 4 is a timing chart showing the operation to supply power to the recording head. At t1, the CPU 102 raises the output port PO1 to "H" level, and a signal VH_PRE is thereby raised to "H" level, and charging of the electrolytic capacitor 105 through the push-pull circuit 108 is started. The head power source voltage HVH rises according to a time constant defined by the electrolytic capacitor 105 and the resistor 109. Hitherto, the power source voltage of 24V has been put directly in the head power source voltage HVH on state by the switching FET. Since the HVH before turned on is 0 V, the voltage difference from the power source voltage is large, and this voltage difference causes an inrush current to the head at the time of power on. In the present invention, a current is limited by the electrolytic capacitor 105, the push-pull circuit 108, and the resistor 109. By gradually reducing the difference between the power source voltage 101 and the head power source voltage HVH, an inrush current to the head is prevented from occurring.

The CPU 102 stands by for two seconds until t2, and the head power source voltage HVH thereby rises to near 24 V of the power source voltage. Two seconds in this embodiment is the above-described predetermined time and means the time required for the capacitor 105 to be gradually charged and for the voltage thereof to become near 24 V as HVH.

The power source voltage HVH is divided by the resistors 112 and 113 and input as a signal VH_SNS at a level that the CPU 102 can read, to the input port PI1 of the CPU 102. At t2, the CPU 102 reads the state of the input port PI1. Although the HVH is slightly below 24 V in the state at t2, the state of the input port PI1 is recognized as "H" level.

At t3, the CPU 102 raises the output port PO2 to "H" level. A signal VH_CNT is thereby raised to "H" level, and the switching FET 103 is turned on, and power is supplied to the recording head. Although the HVH is slightly below 24 V at t2 in FIG. 4, it reaches 24 V when the switching FET 103 is turned on. The inrush current is very small compared to conventional recording apparatuses.

The recording apparatus 1 performs a recording operation from t3 to t4. At t4, when the recording operation is finished, the CPU 102 lowers the output ports PO1 and PO2 to "L" level and stops the power supply to the recording head 3. The electrolytic capacitor 105 is discharged through the push-pull circuit 108, and the head power source voltage HVH decreases.

In this embodiment, a head power source voltage detecting circuit is configured such that the head power source voltage HVH is divided by the resistors 112 and 113 and thereafter input to the CPU 102.

Figure 5:
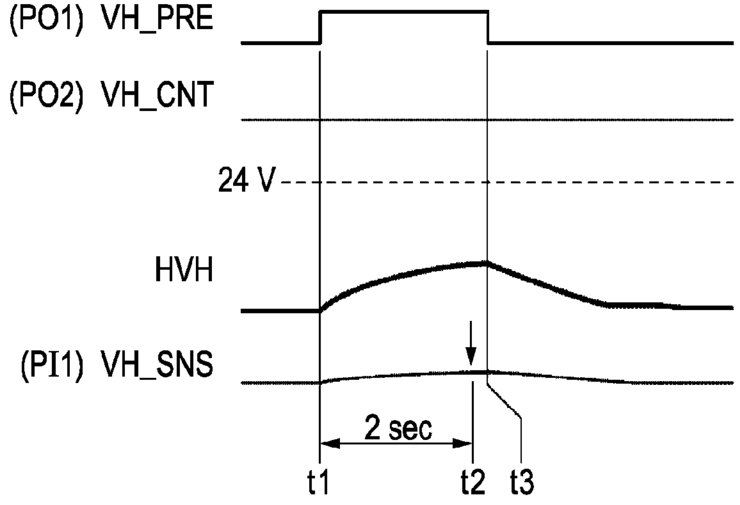
FIG. 5 is a timing chart showing a power supply operation to the recording head in the case of a short circuit.

FIG. 5 is a timing chart showing the operation to supply power to the recording head in the case where the state of the input port PI1 is not at "H" level in step S3 of FIG. 3 (the flow from step S7 on). At t1, the CPU 102 raises the output port PO1 to "H" level as in FIG. 4. However, if the recording head 3 is short-circuited as described above, the head power source voltage HVH is divided into one for the resistor 109 and one for the short resistance of the recording head 3 and does not rise sufficiently. At this time, the current flowing to the recording head 3 is controlled by the resistor 109, and therefore an excessive current does not flow.

At t2, the CPU 102 recognizes the state of the input port PI1 as "L" level.

At t3, the CPU 102 returns the state of the output port PO1 to "L" level (step S7). The electrolytic capacitor 105 is discharged through the push-pull circuit 108. After the discharge is completed, a current does not flow to the recording head 3.

As described above, if the recording head is short-circuited when the power supply to the recording head 3 is turned on, the current flowing to the recording head 3 is controlled by the resistor 109, and therefore an excessive current does not flow.

Second Embodiment

An ink jet recording apparatuses to which the present invention can be applied includes a battery pack that is a power supply device, and a printer connected to the power supply device. The battery pack is detachable from the recording apparatus.

Figure 6A:
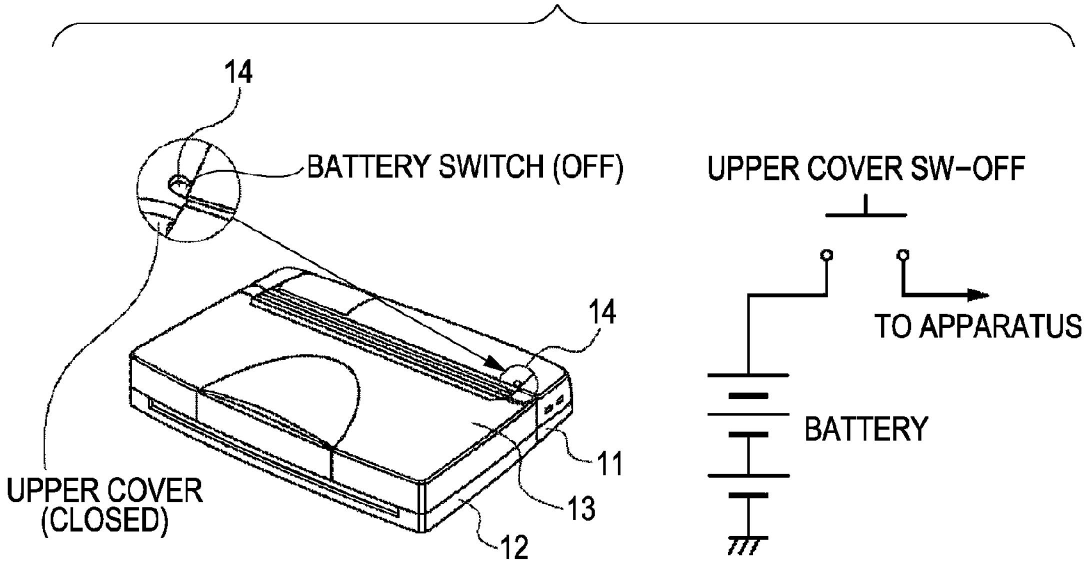
FIG. 6A is a perspective view showing the configuration of a recording apparatus according to a second embodiment.
Figure 6B:
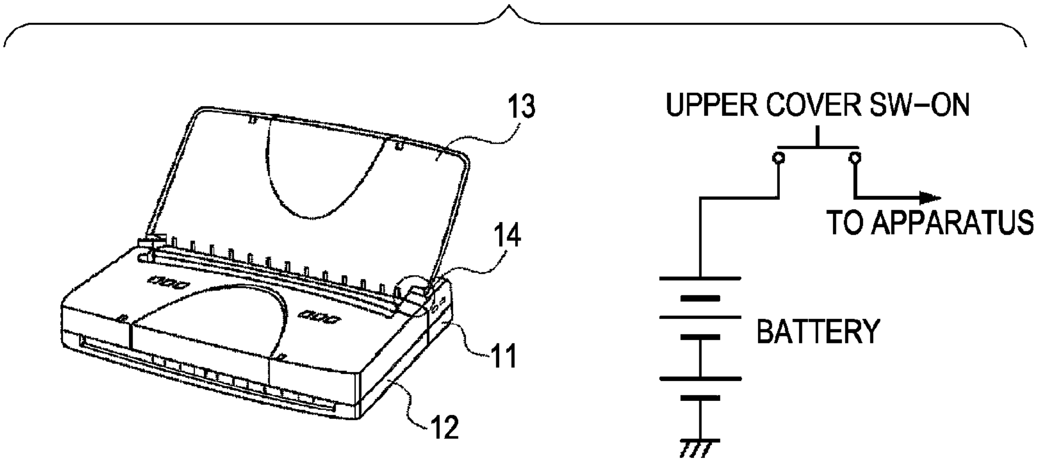
FIG. 6B is a perspective view showing the configuration of a recording apparatus according to a second embodiment.

In FIGS. 6A and 6B, reference numeral 11 denotes a battery case serving as a power supply unit that is attached to a printer 12 and supplies power to the printer 12. The battery case 11 has a battery pack therein that serves as a power source.

The battery case 11 is configured to be able to be easily attached to the exterior of the printer 12. The battery case 11 has a power switch 14 that works in conjunction with the movement of an upper cover 13 of the printer 12. Next, the function of this power switch 14 will be described.

First, as shown in FIG. 6A, when the printer 12 is not used, the upper cover 13 is closed and the power switch 14 is open. At this time, the power switch 14 turns off the power output of the battery case 11 and does not supply power to the printer 12.

Next, when the printer 12 is used, as shown in FIG. 6B, the upper cover 13 is open and the power switch 14 is pressed from above. At this time, the power switch 14 turns on the power output of the battery case 11 and supplies power to the printer 12.

After power is supplied to the main body of the printer from the battery in this way, power may be supplied to the recording head.

Figure 7A:
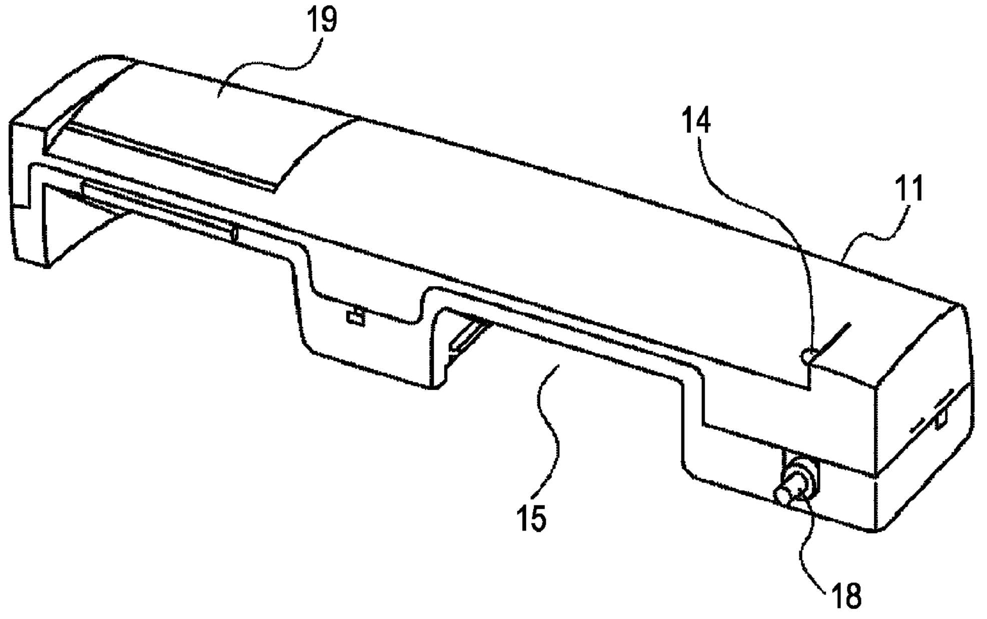
FIG. 7A is a perspective view of a battery case according to a second embodiment.
Figure 7B:
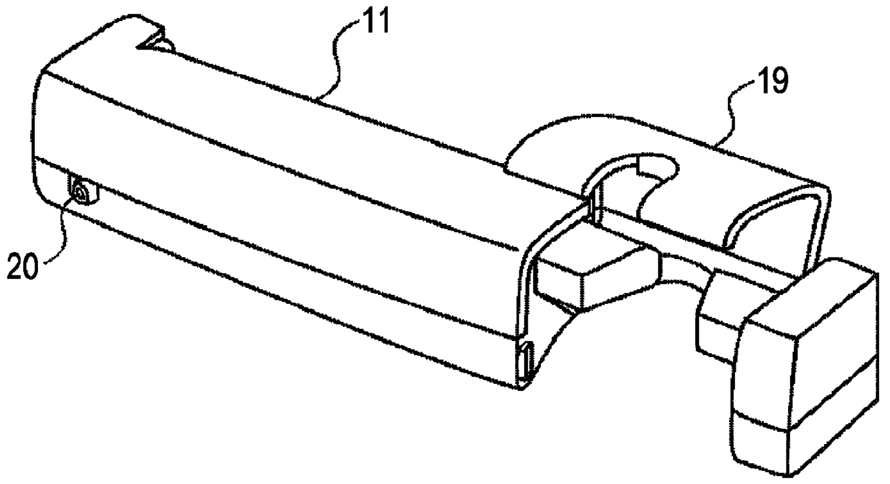
FIG. 7B is a perspective view of a battery case according to a second embodiment.

FIGS. 7A and 7B are external perspective views showing the detail of such a battery case 11 of a printer. FIG. 7A is a view from the side to be connected to the printer 12. FIG. 7B is a view from behind the apparatus.

In FIGS. 7A and 7B, reference numeral 14 denotes a battery switch as described above. When the upper cover 13 of the printer 12 is opened to use the printer 12, the battery switch 14 is pressed down and turned on, and power is supplied from the power source of the battery case 11 to the printer 12. Reference numeral 15 denotes a battery attaching portion to which a battery serving as a power source is attached. A battery pack (not shown) can be detachably attached to the battery attaching portion 15. The power source of the battery pack attached to the battery case 11 is a rechargeable power source that can be reused by charging. Reference numeral 18 denotes a power plug. When the battery case 11 is attached to the printer 12, the plug 18 is connected to a receptacle (not shown) in the printer 12 to supply power. The battery case 11 is configured to be fixed to the printer 12 with a fixing screw.

Reference numeral 19 denotes an interface cover. By opening this interface cover 19, the user can easily attach or detach an interface cable that is connected to the printer 12 and through which, for example, print data is transferred.

FIG. 7B is an external perspective view of the battery case 11, with the interface cover 19 open, from a direction different from that of FIG. 7A. Reference numeral 20 denotes an adaptor receptacle to which is connected a plug of an AC adaptor (not shown) for supplying power to the printer 12, for example, from a household wall socket. The battery pack (not shown) is configured to be able to be charged with power from the AC adaptor connected to the adaptor receptacle 20. When the AC adaptor is connected, power may be supplied to the printer 12 from the AC adaptor instead of the battery pack.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2008-144340 filed Jun. 2, 2008, which is hereby incorporated by reference herein in its entirety.

What is claimed is:

1. A recording apparatus comprising:

a recording head;

a power source portion that generates a voltage;

a capacitor that is connected to the recording head;

a detecting circuit that detects a voltage of the recording head;

a first power supply circuit that supplies the capacitor with power based on the voltage generated by the power source such that a voltage of the capacitor rises to a predetermined voltage lower than a driving voltage of the recording head; and a second power supply circuit that supplies the capacitor with power based on the voltage generated by the power source;

wherein the first power supply circuit discharges the capacitor in a case where the voltage detected by the detecting circuit does not rise to the predetermined voltage at a time after the first power supply circuit supplied the capacitor with power and before the second power supply circuit supplies the capacitor with power, and wherein the second power supply circuit supplies the capacitor with power based on the voltage generated by the power source such that a voltage of the capacitor rises to the driving voltage in a case where the voltage detected by the detecting circuit rises to the predetermined voltage at the time.

2. The recording apparatus according to claim 1, wherein when the recording head is powered on, the first power supply circuit supplies the capacitor with power.

3. The recording apparatus according to claim 1, wherein the first power supply circuit has a resistor that limits the output from the first power supply circuit.

4. The recording apparatus according to claim 1, wherein the first power supply circuit includes a push-pull circuit.

5. The recording apparatus according to claim 4, wherein the push-pull circuit includes a transistor that charges the capacitor and a transistor that discharges the capacitor.

6. The recording apparatus according to claim 1, wherein the second power supply circuit includes a switch.

7. The recording apparatus according to claim 6, wherein the switch includes a Field-Effect Transistor.

8. The recording apparatus according to claim 1, further comprising a determining unit that determines whether the voltage detected by the detecting circuit rises to the predetermined voltage.

* * * * *